# 3,846,281
PLATINUM-MAGNESIUM REFORMING CATALYST

Joseph K. Mertzweiller, Baton Rouge, La., assignor to Exxon Research and Engineering Company
No Drawing. Filed Apr. 3, 1972, Ser. No. 240,835
Int. Cl. C10g 35/08
U.S. Cl. 208—139            10 Claims

ABSTRACT OF THE DISCLOSURE

A process wherein an alkaline earth or Group IIA metal halide, particularly one formed from an alkaline earth metal of atomic number ranging no higher than 56, is added as an additional component to the conventional halogen-containing platinum type reforming catalyst. It is found that the selectivity of a reforming catalyst containing halogen, and one or more of the Group VIII noble metals composited with an inorganic oxide base is improved by combining therewith from about 0.1–5 wt. percent of an alkaline earth metal halide. This is because the added component decreases the normal rate of hydrocracking activity and increases the rate of the aromatization reactions, as compared with a catalyst of similar composition, but for the presence of the halide salt, similarly prepared and used at similar reforming conditions. A preferred catalyst composite contains platinum, alone or in admixture with other platinum group metals or nonplatinum group metals, or both, as a preferred hydrogenation-dehydrogenation component in concentration ranging from about 0.01–5 wt. percent, from about 0.3–3.0 wt. percent halogen, and from about 0.1–5 wt. percent of the alkaline earth metal halide.

---

Catalytic reforming, or hydroforming, is a well-known type of process in the petroleum refining industry and has been used for improving the octane quality of naphthas or gasolines for many years. In a typical process, a series of reactors are provided with fixed catalyst beds, receive downflow feed, and each reactor is preceded by a reheat furnace. A naphtha feed, with hydrogen, is concurrently sequentially passed through a reheat furnace and then to the next reactor of the series. The vapor effluent from the last reactor of the series is a gas rich in hydrogen, and it is separated from the $C_5^+$ liquid product and recycled to the process to minimize coke make, even though overall there is net hydrogen production. The catalysts, because of their expense, generally must be regenerated to maintain their activity. In cyclic processes, a swing reactor is provided wherein the catalyst is regenerated while the other reactors remain on stream. In semi-region operations the entire system is maintained on stream until shut down for catalyst regeneration. The frequency of catalyst regeneration is an important factor in reforming, particularly in semi-regen operations.

Reforming catalysts are recognized as dual-functional, the catalyst composite including a metal, or metals, or a compound or compounds thereof, providing a hydrogenation-dehydrogenation function and an acidic component providing an isomerization and other functions. While such catalysts include many metals which are known to the art, the platinum group or Group VIII noble metals (ruthenium, osmium, rhodium, iridium, palladium and platinum) alone or admixed, with each other or with other metals, despite their expense have been recognized as having a combination of properties which make them particularly suitable for reforming operations. Conventional reforming operations have long employed platinum composited with an inorganic oxide base, particularly alumina, and more recently promoters such as rhenium, germanium, tin, etc., and even other Group VIII noble metals, e.g., iridium, have been added to enhance one or more of certain of the characteristics which a good reforming catalyst must possess—viz., activity, selectivity, activity maintenance, and yield stability. Minor proportions of a halogen, e.g., chlorine, are generally added to supply the acid function required of the catalyst.

The principal reactions produced in reforming are (1) the dehydrogenation of naphthenes to produce the corresponding aromatic hydrocarbons, e.g., methyl cyclohexane is dehydrogenated to form toluene, (2) isomerization of n-paraffin to form branched-chain paraffins and isomerization of ring compounds, e.g., the isomerization of ethyl cyclopentane to form methyl cyclohexane, and dehydrogenation of the latter to form toluene, (3) dehydrocyclization of paraffins to form aromatics, e.g., the dehydrocyclization of n-heptane to form toluene, and (4) hydrocracking of high molecular weight feed consistuents to form lower molecular weight, or lower boiling constituents, e.g., the cracking of decane to produce $C_3$ and $C_7$ hydrocarbons. The net effect of such reactions is to increase the concentrations of aromatics, with subsequent octane improvement of naphthas boiling within the gasoline range. However, such reactions do not always occur to the same extent and the individual reactions are greatly influenced, not only by process conditions, but by the kinds of catalysts used to effect the reactions.

A reforming catalyst must possess sufficient activity to produce aromatics, aromatics production being directly related to octane number requirements. Activity is generally measured in terms of aromatics production as a function of temperature. Reforming catalysts must, in addition to high activity, possess good selectivity which is the ability of the catalyst to produce high yields of high octane number $C_5^+$ liquid products with low production of normally gaseous hydrocarbons, i.e., $C_1$–$C_4$ hydrocarbons, or solid carbonaceous byproducts.

The selectivity of a reforming catalyst necessarily depends on achieving an optimum balance between the aromatization and hydrocracking properties of the catalyst, aromatization being taken to include the naphthene dehydrogenation and paraffin dehydrocyclization reactions. To produce a high octane product the $C_5^+$ liquid reformate must contain a high concentration of aromatics. While hydrocracking also contributes to the octane number of the $C_5^+$ liquid product in that it removes lower octane components, e.g., paraffins, and in so doing thus concentrats the aromatics, the hydrocracking reaction also causes a loss in the $C_5^+$ liquid yield since the $C_1$–$C_4$ components are gaseous and are not included, to any significant extent, in the gasoline fraction. Since hydrocracking reactions are kinetically faster than the other reforming reactions, there is always a serious problem in achieving optimum selectivity for a reforming catalyst.

It is known and described, e.g., in U.S. 2,905,624, to add an alkali or alkaline earth metal compound to a non-acidic base, and then to form a catalyst having hydrogenation-dehydrogenation activity, as, e.g., by compositing a metal constituent having hydrogenation activity, e.g., platinum, with the base. Such catalyst has been used in a process for the production of lubricating oils, and relates to the dehydrogenation of polynuclear naphthenic compounds to form aromatics. Moreover, it is known to add an alkaline earth metal compound to a platinum catalyst of the type used in reforming to suppress the rate of the hydrocracking reaction. In accordance therewith, an alkaline earth metal compound is thus added in amount ranging 0.01 to 1 wt. percent, calculated on a metal basis, to a catalyst comprising alumina, combined halogen in amounts ranging 0.1–8 wt. percent, and platinum in amount ranging 0.01–1 wt. percent. The alkaline earth metal is added, pursuant to the teaching of this patent, in the form of a compound which decomposes in situ to form the corresponding oxide. This catalyst, it is believed, has never achieved commercial significance because the alkaline earth metal oxide produces only a marginal improvement in selectivity, and exerts a harmful effect on the activity of the catalyst, particularly where the alkaline earth metal is present in concentrations exceeding 1% by weight.

Lower severities, i.e., lower temperature, increased feed rate, etc., might seem an answer in reducing the amount of hydrocracking. Or, a decrease in the amount of the acidic component might seem an answer since the function also increases hydrocracking activity. Hence, by lowering the concentration of halogen on the catalyst, it is possible to exercise positive control on the extent of the isomerization reactions as well as on the hydrocracking reaction. Unfortunately, however, such expediencies have their limitations and cannot be employed to lessen hydrocracking without also decreasing the aromatics production, or octane.

Nonetheless, it is a primary objective of the present invention to obviate these and other prior art deficiencies and, in particular, to provide the art with an improved reforming process for upgrading naphthas to produce higher octane gasolines.

A further object is to provide a new and improved reforming process utilizing a superior platinum group metal catalyst for effecting, at suitable reforming conditions, the production of high octane gasolines.

A more particular object is to provide a new and improved catalyst composition especially suitable for reforming.

These objects and others are achieved in accordance with the present invention wherein an alkaline earth or Group IIA metal halide, particularly one formed from an alkaline earth metal of atomic number ranging no higher than 56, is added as an additional component to conventional halogen containing platinum type reforming catalysts. It is found that the selectivity of a reforming catalyst containing halogen, and one or more of the Group VIII noble metals (or platinum group metals) composited with an inorganic oxide base, is improved by combining therewith from about 0.1 to about 5 wt. percent, and preferably from about 0.3 to about 1.5 wt. percent, of the halide salt of an alkaline earth or Group IIA metal of the Periodic Table of the Elements (E. H. Sargent and Co., Copyright 1962 Dyna-Slide Co.). Specifically, it is found that a platinum catalyst which contains an alkaline earth metal halide effects a lower rate of hydrocracking activity, at similar reforming conditions, than a catalyst of similar composition, similarly prepared, except for the presence of the alkaline earth metal halide. Moreover, the alkaline earth metal halide containing catalyst effects a higher aromatization rate at similar process conditions. Furthermore, in comparing the alkaline earth metal halide containing catalyst at similar process conditions with one of similar composition, similarly prepared, except that an alkaline earth metal oxide is employed in lieu of its corresponding halide (in equal metal concentrations), it is found that the alkaline earth metal halide catalyst also effects a considerably higher aromatization rate than either the non-promoted catalyst species, or that catalyst species to which an alkaline earth metal oxide is added.

A preferred catalyst composite contains platinum, alone or in admixture with other platinum group or non-platinum group metals, or both, as the hydrogenation-dehydrogenation component in concentration ranging from about 0.01 to about 5 wt. percent, preferably from about 0.2 to about 1.0 wt. percent; from about 0.3 to about 3.0 wt. percent total halogen, preferably from about 0.6 wt. percent to about 2.0 wt. percent total halogen; and from about 0.1 to about 5 wt. percent, and preferably from about 0.3 to about 1.0 wt. percent, of the Group IIA metal halide. The optimum concentration of the Group IIA metal halide, however, varies to some extent, depending on the specific nature of the alkaline earth metal halide and the type of feedstock processed. The Group IIA metal halide, e.g., a chloride or fluoride of a Group IIA metal comprising berylium, magnesium, calcium, strontium, or barium, can be impregnated on the inorganic oxide support, preferably alumina, either before, during or subsequent to the impregnation of the support with the Group VIII noble metal, or metals. While platinum is preferred of the Group VIII noble metals, ruthenium, osmium, rhodium, iridium, palladium and mixtures of these with each other, e.g., platinum and iridium, or with other metals, e.g., rhenium, germanium, tin, and the like, or both, are also suitable.

The Group VIII noble metal components are preferably employed in relation to the Group IIA metal halides in Group VIII; Group II metal molar ratios ranging from about 0.001:1 to about 1.0:1, and more preferably in molar ratios ranging from about 0.01:1 to about 0.1:1, a composition comprising a molar ratio of from about 0.02:1 to about 0.04:1 being found particularly satisfactory. In addition, the halogen is employed in somewhat greater concentration than in the use of corresponding catalysts when no Group IIA metal halide is present. In general, the molar ratio of the Group IIA metal, as metallic metal, ranges from about 0.1:1 to about 3:1, and preferably from about 0.5:1 to about 1:1, in relation to the total halogen contained within the catalyst.

While Applicant does not desire to be bound by a specific theory of mechanism, it is believed that the greater selectivity of the catalyst of this invention results from the more acidic nature of the halides, as contrasted with the more basic nature of the oxides. In terms of the theory of Lewis acids, this means that one should be able to control the degree of "softness" of the acid catalyst function, e.g. by varying the ratio of total halide to Group IIA metal. This means a better opportunity to achieve desirable reactions, e.g., isomerization of $C_5$ naphthenes, while suppressing undesirable reactions, e.g., the hydrocracking reaction.

Suitably, mildly or moderately acidic refractory inorganic oxides are employed as supports, e.g., silica, silica-alumina, magnesia, thoria, boria, titania, zirconia, various spinels and the like, including in particular alumina, which is preferred, and more particularly gamma alumina, which is particularly preferred. High surface area catalysts, or catalysts having surface areas ranging upwardly from about 100 square meters per gram are preferred. In particular, catalysts having surface areas ranging from about 100 to about 600 square meters per gram prove quite satisfactory.

In formation of the more active catalyst, refractory inorganic oxides of desired particle size distribution, in dry state, can be contacted, and mixed, or otherwise incorporated with a metal-containing solution, or solutions, and thereby impregnated. The refractory inorganic oxide can be pilled, pelleted, beaded, or extruded, alone or in a mixture with other materials, and dried and crushed to form particles of desired size ranging, e.g., from about 0.01 to about 0.4 inch in diameter, and preferably from about 0.1 to about 0.3 inch average diameter. The support can thus be treated by contact with a solution containing the desired amounts of the Group VIII noble metal and Group IIA metal halide, or treated sequentially by contact with a solution containing one metal salt and then the other, in desired amounts. Preferably, the Group VIII metal compound is first added to the support and the Group IIA metal halide is subsequently added. On the other hand, larger particles can be so-treated and then crushed to the desired size. The particulate mass, in either instance, can be dried and calcined, and contacted with hydrogen, in situ or ex situ, to reduce the Group VIII metal salts. Suitably, also, the catalyst composite can be formed by adding together suitable reagents such as salts of the Group VIII metals and Group IIA metal halides, and ammonium hydroxide or ammonium carbonate, and a salt of aluminum. The aluminum hydroxide containing the salts of the noble and alkaline earth metals can then be heated, dried, and simultaneously converted to alumina. Material can then be calcined and then hydrogen-treated, in situ or ex situ, to reduce the noble metal salts and complete the formation of the catalyst composite.

A suitable feed, e.g., a naphtha, either virgin or cracked, Fischer-Tropsch or mixtures thereof, is contacted at reforming conditions in the presence of of hydrogen with a catalyst composite including the support which contains catalytically active amounts of halogen, and the Group VIII noble metal and Group IIA metal halide. Typical feed stream hydrocarbon molecules are those containing from about 5 to 12 carbon atoms, or more preferably from about 6 to about 9 carbon atoms. Naphthas, or petroleum fractions boiling within the range of from about 80° F. to about 450° F., and preferably from about 125° F. to about 375° F., contain hydrocarbons of carbon numbers within these ranges. Typical fractions thus usually contain from about 20 to about 80 volume percent of paraffins, both normal and branched, which fall in the range of about $C_5$ to $C_{12}$, from about 20 to 80 volume percent of naphthenes falling within the range of from about $C_6$ to $C_{12}$, and about 5 through 20 volume percent of the desirable aromatics falling within the range of from about $C_6$ to $C_{12}$.

While it is most desirable to treat a petroleum fraction, such as described, essentially any hydrocarbon fraction containing paraffins, naphthenes and the like can be converted by means of the catalyst at temperatures ranging from about 600 to 1050° F., and preferably at temperatures ranging from about 850 to about 1000° F. Pressures ranging from about 50 to about 750 p.s.i.g., and preferably from about 100 to about 500 p.s.i.g. are generally preferred.

The reactions are conducted in the presence of hydrogen to suppress side reactions normally leading to the formation of unsaturated carbonaceous residues, or coke, which deposit on the catalyst and cause deactivation. The hydrogen rate, once-through or recycle, is generally within the range of about 2000 to about 10,000 s.c.f./bbl. The feed stream, in admixture with hydrogen, is passed over the catalyst at space velocities ranging from about 0.1 to about 25 w./w./hr., and preferably from about 0.5 to about 5.0 w./w./hr.

The invention will be more fully understood by reference to the following selected non-limiting examples and comparative data which illustrate its more salient features. All parts are given in terms of weight except as otherwise specified.

EXAMPLE 1

Two catalysts containing 0.6 wt. percent magnesium, respectively, on a gamma alumina base, of the type typical for manufacturing reforming catalysts, are prepared by impregnating the base with a solution of magnesium nitrate (Catalyst A) and a solution of magnesium chloride (Catalyst B), respectively, in sufficient water to just barely wet and become completely absorbed by the alumina, drying in a vacuum oven, then calcining at 1000° F. in dry air for 2 hours. Platinum, 0.3%, and chloride, 0.7–0.8%, are put on each of the catalysts by impregnation with a solution of chloroplatinic acid and excess hydrochloric acid. The catalysts are dried in a vacuum oven, then placed in a heated tube and dried for 3 hours in a vigorous flow of dry nitrogen. The catalysts are then reduced in hydrogen for 2 hours at 900° F. and stored in sealed containers under dry n-heptane.

A third catalyst (Catalyst C) is similarly prepared except that no magnesium is impregnated onto the alumina base.

The three catalysts are tested for the reforming of Aramco naphtha at 925° F., at a space velocity of 1 w./hr./w., at a pressure of 200 p.s.i.g. and at a hydrogen rate (once-through) of 4500 s.c.f./bbl. of feed in a small (10 cc. catalyst) continuous flow testing unit. Temperature is kept constant and the catalysts allowed to deactivate with time. Comparative data are taken at between 20 and 100 hours catalyst age for aromatization (dehydrocyclization) rate in w./hr./w. and hydrocracking (formation of $C_1$–$C_4$) rate in w./hr./w. These comparative data, given in Table I below, are expressed in rates relative to the catalyst containing magnesium in the form of an oxide (Catalyst A), magnesium in the form of a halide (Catalyst B), a catalyst containing no magnesium (Catalyst C).

TABLE I

[Aramco naphtha: 925° F., 1.1 w./hr./w., 200 p.s.i.g., 4,500 s.c.f. $H_2$/B]

| | Run | | |
|---|---|---|---|
| | 1 | 2 | 3 |
| Catalyst | A, 0.6% Mg (as oxide) | B, 0.6% Mg (as chloride) | C, 0.0% Mg |
| Activity, k | 0.23–0.13 | 0.66–0.42 | 0.94–0.73 |
| Rates, w./hr./w.: | | | |
| Aromatization | 0.354–0.333 | 0.389–0.395 | 0.385–0.354 |
| Hydrocracking | 0.171–0.164 | 0.238–0.207 | 0.267–0.265 |
| $C_{5+}$ yield, vol. percent | 78.6–80.0 | 73.6–75.6 | 70.3–71.9 |
| RON | 94.2 | 98.7–97.4 | 99.0–98.0 |

These data show that the aromatization rate of the catalyst containing the magnesium chloride (Catalyst B) is considerably superior to that of either Catalyst A or Catalyst C, and that the improved aromatization rate continues over a significant period of time. In contrast, the aromatization rate of both Catalyst A and Catalyst C decreases with increasing time. Moreover, the activity loss of the catalyst containing the magnesium chloride (Catalyst B) is considerably less than that of Catalyst A which contains magnesium in the form of its oxide.

The rate of hydrocracking produced by Catalyst B, while greater than that of Catalyst A, is considerably less than that of Catalyst C. The RON octane number of the liquid product produced by Catalyst B is far greater than that produced by Catalyst A, and only slightly below that produced by Catalyst C.

The activity maintenance of Catalyst B surpasses that of both Catalyst A and Catalyst C. On balance, therefore, and quite surprisingly, it is found that the magnesium halide is very active, but yet far more effective than magnesium oxide in improving the selectivity of a platinum type reforming catalyst.

EXAMPLES 2–4

Similar runs are conducted with Catalysts D and E wherein 0.6% calcium chloride and 0.6% strontium chloride, respectively, are impregnated into a gamma alumina base, dried, calcined, impregnated with 0.3% platinum and 0.7–0.8% chloride, and runs conducted as described in the foregoing examples. In addition, a Catalyst F is similarly prepared and used except that this catalyst contains 1.2% magnesium chloride. The results of these runs are as given in Table II, below.

TABLE II

[Aramco naphtha: 925° F., 1.1 w./hr./w., 200 p.s.i.g., 4,500 s.c.f. $H_2$/B

| | Run | | |
|---|---|---|---|
| | 4 | 5 | 6 |
| Catalyst | D | E | F |
| Activity, k | −0.06–0.02 | 0.02–(−0.06) | 0.44–0.20 |
| Rates, w./hr./w.: | | | |
| Aromatization | 0.270–0.284 | 0.280–0.273 | 0.394–0.375 |
| Hydrocracking | 0.120–0.098 | 0.158–0.117 | 0.219–0.188 |
| $C_{5+}$ yield, vol. percent | 83.7–85.5 | 80.5–85.5 | 73.6–77.0 |
| RON | 86.0–84.0 | 93.5–87.0 | 98.5–95.0 |

At similar conditions, using more optimum concentrations of calcium and strontium chloride, i.e., from about 0.1 to about 0.2 wt. percent calcium chloride and strontium chloride, respectively, even greater benefits are obtained.

Having described the invention, what is claimed is:

1. A process for improving the octane quality of naphthas comprising contacting the said naphtha at reforming conditions with a catalyst composite comprising porous inorganic oxide support, from about 0.3 to about 3.0 wt. percent halogen, and from about 0.01 to about 5.0 wt. percent of a hydrogenation-dehydrogenation component comprising a Group VIII noble metal and from about 0.1 to about 5.0 wt. percent of a Group IIA metal halide which is added as an additional component to the composite.

2. The process of Claim 1 wherein the catalyst composite contains from about 0.6 to about 2.0 wt. percent halogen.

3. The process of Claim 2 wherein the halogen is chlorine.

4. The process of Claim 1 wherein the catalyst composite is comprised of a platinum hydrogenation-dehydrogenation component and the Group IIA metal halide which is added as an additional component is magnesium chloride.

5. The process of Claim 4 wherein the catalyst composite contains from about 0.6 to about 2.0 wt. percent magnesium chloride added as an additional component.

6. A catalyst composite useful for reforming comprising a porous inorganic oxide support, from about 0.3 to about 3.0 wt. percent halogen, from about 0.01 to about 5.0 wt. percent of a hydrogenation-dehydrogenation component comprising a Group VIII noble metal and from about 0.1 to about 5.0 wt. percent of a Group IIA metal halide added as an additional component.

7. The catalyst composite of Claim 6 which contains from about 0.6 to about 2.0 wt. percent halogen.

8. The catalyst composite of Claim 7 wherein the halogen is chlorine.

9. The catalyst composite of Claim 6 wherein the hydrogenation-dehydrogenation component is comprised of platinum and the Group IIA metal halide which is added as an additional component is magnesium chloride.

10. The catalyst composite of Claim 9 wherein there is contained from about 0.6 to about 2.0 wt. percent of magnesium chloride added as an additional component.

References Cited

UNITED STATES PATENTS

| | | | |
|---|---|---|---|
| 2,487,978 | 11/1949 | Murray | 252—441 |
| 2,449,061 | 9/1948 | Darling | 252—441 |
| 3,455,813 | 7/1969 | Hovestreydt et al. | 208—138 |
| 3,436,335 | 4/1969 | Mazink | 208—65 |
| 3,437,428 | 4/1969 | Quesada et al. | 252—441 |
| 3,173,857 | 3/1965 | Haensel | 208—139 |
| 2,602,772 | 5/1949 | Haensel | 208—139 |
| 3,461,177 | 8/1969 | Box et al. | 260—673.5 |
| 3,719,721 | 3/1973 | Hansford | 260—673.5 |

DELBERT E. GANTZ, Primary Examiner

J. W. HELLWEGE, Assistant Examiner

U.S. Cl. X.R.

252—441